United States Patent
Bäckman et al.

(10) Patent No.: US 8,557,924 B2
(45) Date of Patent: *Oct. 15, 2013

(54) POLYMER COMPOSITIONS AND PRESSURE-RESISTANT PIPES MADE THEREFROM

(75) Inventors: Mats Bäckman, Göteborg (SE); Carl-Gustaf Ek, Västra Frölunda (SE); Anneli Pakkanen, Vasterskog (FI); Magnus Palmlöf, Västra Frölunda (SE)

(73) Assignee: Borealis AG (AT)

( * ) Notice: Subject to any disclaimer, the term of this patent is extended or adjusted under 35 U.S.C. 154(b) by 0 days.

This patent is subject to a terminal disclaimer.

(21) Appl. No.: 12/995,604

(22) PCT Filed: May 25, 2009

(86) PCT No.: PCT/EP2009/056308
§ 371 (c)(1),
(2), (4) Date: Jan. 17, 2011

(87) PCT Pub. No.: WO2009/147023
PCT Pub. Date: Dec. 10, 2009

(65) Prior Publication Data
US 2011/0108121 A1    May 12, 2011

(30) Foreign Application Priority Data
Jun. 2, 2008   (EP) .................................. 08010016

(51) Int. Cl.
*C08L 23/04* (2006.01)
*C08L 23/08* (2006.01)
*C08F 4/6592* (2006.01)

(52) U.S. Cl.
USPC ............. 525/240; 526/65; 526/160; 526/348; 526/943; 525/191

(58) Field of Classification Search
USPC ............. 525/191, 240; 526/65, 160, 348, 943
See application file for complete search history.

(56) References Cited

U.S. PATENT DOCUMENTS 6,566,450 B2 * 5/2003 Debras et al. ................ 525/191
2012/0000534 A1 * 1/2012 Belloir et al. ..................... 137/1

FOREIGN PATENT DOCUMENTS

| EP | 1574549 A1 | 9/2005 |
| EP | 1927626 A1 | 6/2008 |
| WO | 2007/003322 A1 | 1/2007 |

OTHER PUBLICATIONS

International Search Report and Written Opinion for PCT/EP2009/056308, mailed Aug. 19, 2009.

* cited by examiner

*Primary Examiner* — Caixia Lu
(74) *Attorney, Agent, or Firm* — Milbank Tweed Hadley & McCloy LLP

(57) ABSTRACT

The present invention deals with polymer compositions suitable for making pipes. The compositions comprise a multimodal copolymer of ethylene and one or more alpha-olefins having from 4 to 10 carbon atoms wherein the multimodal ethylene copolymer has a density of from 924 to 935 kg/m$^3$, a melt index MFR$_5$ of from 0.5 to 6.0 g/10 min, a melt index MFR$_2$ of from 0.1 to 2.0 g/10 min and a shear thinning index SHI$_{2.7/210}$ of from 2 to 50. In addition the multimodal copolymer comprises:

(A) from 30 to 70% by weight, based on the combined amount of components (A) and (B), of a low molecular weight ethylene polymer selected from ethylene homopolymer and a copolymer of ethylene and one or more alpha-olefins having from 4 to 10 carbon atoms and having a weight average molecular weight of from 5000 to 100000 g/mol and a density of from 945 to 975 kg/m$^3$; and (B) from 30 to 70% by weight, based on the combined amount of components (A) and (B), of a high molecular weight copolymer of ethylene and one or more alpha-olefins having from 4 to 10 carbon atoms and having a weight average molecular weight of from 100000 to 1000000 g/mol and a density of from 890 to 929 kg/m3.

15 Claims, 1 Drawing Sheet

US 8,557,924 B2

POLYMER COMPOSITIONS AND PRESSURE-RESISTANT PIPES MADE THEREFROM

This application is based on International Application PCT/EP2009/0563082 filed May 25, 2009, which claims priority to European Patent Application No. 08010016.7, filed on Jun. 2, 2008, the disclosures of which are herein incorporated by reference in their entireties.

OBJECTIVE OF THE INVENTION

The present invention is directed for polymer compositions for making pipes. Especially, the present invention is directed for polymer compositions for making flexible pipes having good mechanical properties and which are useful for transporting fluids under pressure. In addition the present invention is directed to pipes made of the polymer compositions and to methods of making them.

TECHNICAL BACKGROUND AND PRIOR ART

Pipes made of polyethylene have become popular in transporting water and gas, for instance in houses and in municipal water distribution. Polyethylenes having a high or medium density are frequently used in such pipes due to their good mechanical properties and ability to withstand pressure. Especially pipes made of multimodal polyethylene having a density of from about 947 to 953 kg/m$^3$ have become increasingly popular. Such pipes and polymer compositions suitable for making them are disclosed, among others, in WO-A-00/01765, WO-A-00/22040, EP-A-739937, EP-A-1141118, EP-A-1041113, EP-A-1330490 and EP-A-1425344. A co-pending European Patent Application No. 06020872.5 discloses flexible pressure-resistant pipes made of bimodal polyethylene and having a density of from 940 to 947 kg/m$^3$.

Such pipes, however, suffer from the disadvantage that the pipes made of HDPE materials are not flexible enough so that they could be wound to a coil which is preferred in certain applications. Flexible pipes have been made from linear low density polyethylene and they are disclosed, among others, in EP-A-1574549. However, such pipes often lack the sufficient mechanical properties that are required from pipes used for transporting water or gas at high pressure.

SUMMARY OF THE INVENTION

The disadvantages of the prior art compositions and pipes are solved by the present polymer compositions and pipes made of them. Especially, the polymer compositions are flexible so that the pipes made of them can easily be bent and coiled. Additionally, the pipes have sufficient mechanical strength that they can be used in pressure pipe applications. Especially the material meets the PE80 qualifications.

As seen from one aspect, the present invention provides polymer compositions comprising a multimodal copolymer of ethylene and one or more alpha-olefins having from 4 to 10 carbon atoms wherein the multimodal ethylene copolymer has a density of from 924 to 935 kg/m$^3$, a melt index MFR$_5$ of from 0.5 to 6.0 g/10 min, a melt index MFR$_2$ of from 0.1 to 2.0 g/10 min and a shear thinning index SHI$_{2.7/210}$ of from 2 to 50.

As seen from another aspect, the present invention provides pipes made of the polymer compositions comprising a multimodal copolymer of ethylene and one or more alpha-olefins having from 4 to 10 carbon atoms wherein the multimodal ethylene copolymer has a density of from 924 to 935 kg/m$^3$, a melt index MFR$_5$ of from 0.5 to 6.0 g/10 min, a melt index MFR$_2$ of from 0.1 to 2.0 g/10 min and a shear thinning index SHI$_{2.7/210}$ of from 2 to 50.

As seen from still another aspect, the present invention provides a method for making pipes wherein the method comprises the steps of:

(i) polymerising, in a first polymerisation step in a first polymerisation zone, in the presence of a single site polymerisation catalyst, ethylene, hydrogen and optionally one or more alpha-olefins having 4 to 10 carbon atoms to form the low molecular weight component (A) having a weight average molecular weight of from 5000 to 100000 g/mol and a density of from 945 to 975 kg/m$^3$;

(ii) polymerising, in a second polymerisation step in a second polymerisation zone, in the presence of a single site polymerisation catalyst, ethylene, one or more alpha-olefins having 4 to 10 carbon atoms and optionally hydrogen to form the high molecular weight component (B) having a weight average molecular weight of from 100000 to 1000000 g/mol and a density of from 890 to 929 kg/m$^3$;

wherein the first polymerisation step and the second polymerisation step may be conducted in any order and the subsequent step is conducted in the presence of the polymer produced in the prior step and the components (A) and (B) are present in the amounts of 30 to 70% and 70 to 30%, respectively, based on the combined amounts of components (A) and (B), and wherein the multimodal ethylene copolymer has a density of from 924 to 935 kg/m$^3$, a melt index MFR$_5$ of from 0.5 to 6.0 g/10 min, a melt index MFR$_2$ of from 0.1 to 2.0 g/10 min and a shear thinning index SHI$_{2.7/210}$ of from 2 to 50.

As seen from a further aspect, the present invention provides the use of the compositions comprising a multimodal copolymer of ethylene and one or more alpha-olefins having from 4 to 10 carbon atoms wherein the multimodal ethylene copolymer has a density of from 924 to 935 kg/m$^3$, a melt index MFR$_5$ of from 0.5 to 6.0 g/10 min, a melt index MFR$_2$ of from 0.1 to 2.0 g/10 min and a shear thinning index SHI$_{2.7/210}$ of from 2 to 50 for making pipes.

As seen from a still further aspect, the present invention provides the use of pipes as disclosed above for transporting water or gas under pressure.

DETAILED DESCRIPTION

Below the invention, its preferred embodiments and its advantages are described more in detail.

Multimodal Ethylene Polymer

The multimodal ethylene copolymer is a copolymer of ethylene and at least one alpha-olefin having from 4 to 10 carbon atoms. It has a density of from 924 to 935 kg/m$^3$, preferably from 925 to 934 kg/m$^3$ and in particular 927 to 933 kg/m$^3$. Additionally it has a melt index MFR$_5$ of from 0.5 to 6.0 g/10 min, preferably from 0.5 to 2.0 g/10 min and more preferably from 0.6 to 1.4 g/10 min. Further, it has a melt index MFR$_2$ of from 0.1 to 2.0 g/10 min, preferably from 0.2 to 1.0 g/10 min, more preferably from 0.2 to 0.7 g/10 min and in particular from 0.2 to 0.45 g/10 min. Additionally it has a shear thinning index SHI$_{2.7/210}$ of from 2 to 50, preferably from 3 to 30, especially preferably from 3 to 20 and in particular 3 to 15.

The multimodal ethylene copolymer preferably has a weight average molecular weight of from 75000 g/mol to 250000 g/mol, more preferably from 100000 g/mol to 250000 g/mol and in particular from 120000 g/mol to 220000 g/mol. Additionally, it preferably has a number average molecular weight of 15000 g/mol to 40000 g/mol, and more preferably 18000 to 30000 g/mol. It furthermore preferably has a ratio Mw/Mn of from 4 to 15, more preferably from 4 to 10.

The multimodal ethylene copolymer preferably has a composition distribution as determined by TREF such that from 1 to 15% by weight of the polymer, more preferably from 2 to 10% by weight, is eluted at a temperature of lower than 80° C. Additionally or alternatively, from 0.1 to 10% by weight, preferably from 0.2 to 5% by weight elutes at a temperature of higher than 100° C.

Preferably the multimodal ethylene copolymer comprises a low molecular weight ethylene polymer component (A) and a high molecular weight ethylene copolymer component (B). Especially, the composition preferably contains from 30 to 70% the low molecular weight polymer (A) and more preferably from 35 to 50%. In addition, the composition preferably contains from 70 to 30% by weight of the copolymer (B) and more preferably from 65 to 50% The percentage figures are based on the combined weight of components (A) and (B). The components (A) and (B) are explained more in detail below.

The low molecular weight polymer component (A) is an ethylene homopolymer or a copolymer of ethylene and one or more alpha-olefins having from 4 to 10 carbon atoms. It preferably has a weight average molecular weight Mw of from 5000 to 100000 g/mol, more preferably 10000 to 100000 g/mol, especially preferably from 15000 to 80000 g/mol and in particular from 15000 to 50000 g/mol. Preferably it has a melt index $MFR_2$ of from 20 to 1500 g/10 min. Moreover, it preferably has a narrow molecular weight distribution having a ratio of the weight average molecular weight to the number average molecular weight of from 2 to 5.0, more preferably from 2 to 4 and in particular from 2 to 3. Furthermore, it preferably has a density of from 945 to 975 kg/m$^3$, more preferably from 955 to 975 kg/m$^3$. Especially preferably the low molecular weight ethylene polymer (A) is an ethylene homopolymer.

The high molecular weight polymer component (B) is a copolymer of ethylene and one or more alpha-olefins having from 4 to 10 carbon atoms. Preferably the comonomer is an alpha-olefin having from 6 to 8 carbon atoms. It preferably has a weight average molecular weight Mw of from 100000 to 1000000 g/mol and more preferably from 150000 to 500000 g/mol. Preferably it has a melt index $MFR_2$ of from 0.01 to 0.3 g/10 min. Moreover, it preferably has a narrow molecular weight distribution having a ratio of the weight average molecular weight to the number average molecular weight of from 2 to 5, more preferably from 2 to 3.5. Furthermore, it preferably has a density of from 890 to 929 kg/m$^3$, more preferably from 890 to 925 kg/m$^3$, and especially preferably from 900 to 922 kg/m$^3$.

By ethylene homopolymer is meant a polymer which substantially consists of ethylene units. As the process streams may have a small amount of other polymerisable species as impurities the homopolymer may contain a small amount of units other than ethylene. The content of such units should be lower than 0.2% by mole, preferably less than 0.1% by mole.

By copolymer of ethylene and one or more alpha-olefins having from 4 to 10 carbon atoms is meant a copolymer which has a majority of ethylene units and substantially consists of units derived from ethylene and alpha-olefins having from 4 to 10 carbon atoms. As the process streams may have a small amount of other polymerisable species as impurities the copolymer may contain a small amount of units other than ethylene and alpha-olefins having from 4 to 10 carbon atoms. The content of such units should be lower than 0.2% by mole, preferably less than 0.1% by mole.

The low molecular weight polymer component (A) and the high molecular weight polymer component (B) can also be blends of two or more different polymer fractions provided that each fraction, as well as the blend, meets the requirements given above for the specific component.

The multimodal ethylene copolymer may also contain minor amounts of other polymers, such as prepolymer. The amount of such polymers should not exceed 5%, preferably not 2% by weight of the multimodal ethylene copolymer.

According to one embodiment of the invention the multimodal ethylene copolymer has a melt index $MFR_5$ of 0.5 to 2.0 g/10 min, preferably from 0.6 to 1.4 g/10 min. It has a density of from 924 to 935 kg/m$^3$, preferably from 925 to 934 kg/m$^3$ and in particular 927 to 933 kg/m$^3$. Furthermore, it has a melt index $MFR_2$ of 0.1 to 1.0 g/10 min preferably from 0.2 to 0.45 g/10 min. It also has a shear thinning index $SHI_{2.7/210}$ of from 2 to 30, preferably from 3 to 20 and particular from 3 to 15.

According to another embodiment of the invention the multimodal ethylene copolymer has a melt index $MFR_5$ of 1.0 to 6.0 g/10 min, preferably from 1.4 to 6.0 g/10 min. It has a density of from 924 to 935 kg/m$^3$. Furthermore, it has a melt index $MFR_2$ of 0.4 to 2.0 g/10 min, preferably from 0.5 to 2.0 g/10 min. It also has a shear thinning index $SHI_{2.7/210}$ of from 2 to 30, preferably from 3 to 15.

Polymerisation Process

The multimodal ethylene copolymer is typically produced in a multistage polymerisation process in the presence of a single site catalyst.

In the multistage polymerisation process ethylene and alpha-olefins having from 4 to 10 carbon atoms are polymerised in a process comprising at least two polymerisation stages. Each polymerisation stage may be conducted in a separate reactor but they may also be conducted in at least two distinct polymerisation zones in one reactor. Preferably, the multistage polymerisation process is conducted in at least two cascaded polymerisation stages.

Catalyst

The polymerisation is typically conducted in the presence of a single site polymerisation catalyst. Preferably the single site catalyst is a metallocene catalyst. Such catalysts comprise a transition metal compound which contains a cyclopentadienyl, indenyl or fluorenyl ligand. Preferably the catalyst contains two cyclopentadienyl, indenyl or fluorenyl ligands, which may be bridged by a group preferably containing silicon and/or carbon atom(s). Further, the ligands may have substituents, such as alkyl groups, aryl groups, arylalkyl groups, alkylaryl groups, silyl groups, siloxy groups, alkoxy groups and like. Suitable metallocene compounds are known in the art and are disclosed, among others, in WO-A-97/28170, WO-A-98132776, WO-A-99161489, WO-A-031010208, WO-A-03/051934, WO-A-03/051514, WO-A-20041085499, EP-A-1752462 and EP-A-1739103.

Especially, the metallocene compound must be capable of producing polyethylene having sufficiently high molecular weight. Especially it has been found that metallocene compounds having hafnium as the transition metal atom or metallocene compounds comprising an indenyl or tetrahydroindenyl type ligand often have the desired characteristics.

One example of suitable metallocene compounds is the group of metallocene compounds having zirconium, titanium or hafnium as the transition metal and one or more ligands having indenyl structure bearing a siloxy substituent, such as [ethylenebis(3,7-di(tri-isopropylsiloxy)inden-1-yl)]zirconium dichloride (both rac and meso), [ethylenebis(4,7-di(tri-isopropylsiloxy)inden-1-yl)]zirconium dichloride (both rac and meso), [ethylenebis(5-tert-butyldimethylsiloxy)inden-1-yl)]zirconium dichloride (both rac and meso), bis(5-tert-butyldimethylsiloxy)inden-1-yl)zirconium dichloride, [dimethylsilylenenebis(5-tert-butyldimethylsiloxy)inden-1-yl)] zirconium dichloride (both rac and meso), (N-tert-butylamido)(dimethyl)($\eta^5$-inden-4-yloxy)silanetitanium dichloride and [ethylenebis(2-(tert-butydimethylsiloxy)inden-1-yl)]zirconium dichloride (both rac and meso).

Another example is the group of metallocene compounds having hafnium as the transition metal atom and bearing a cyclopentadienyl type ligand, such as bis(n-butylcyclopentadienyl)hafnium dichloride, bis(n-butylcyclopentadienyl) dibenzylhafnium, dimethylsilylenenebis(n-butylcyclopentadienyl)hafnium dichloride (both rac and meso) and bis[1,2,4-tri(ethyl)cyclopentadienyl]hafnium dichloride.

Still another example is the group of metallocene compounds bearing a tetrahydroindenyl ligand such as bis(4,5,6,7-tetrahydroindenyl)zirconium dichloride, bis(4,5,6,7-tetrahydroindenyl)hafnium dichloride, ethylenebis(4,5,6,7-tetrahydroindenyl)zirconium dichloride, dimethylsilylenebis(4,5,6,7-tetrahydroindenyl)zirconium dichloride.

The single site catalyst typically also comprises an activator. Generally used activators are alumoxane compounds, such as methylalumoxane (MAO), tetraisobutylalumoxane (TIBAO) or hexaisobutylalumoxane (HIBAO). Also boron activators, such as those disclosed in US-A-2007/049711 may be used. The activators mentioned above may be used alone or they may be combined with, for instance, aluminium alkyls, such as triethylaluminium or tri-isobutylaluminium.

The catalyst is preferably supported. The support may be any particulate support, including inorganic oxide support, such as silica, alumina or titania, or polymeric support, such as polymer comprising styrene or divinylbenzene.

The catalyst may also comprise the metallocene compound on solidified alumoxane or it may be a solid catalyst prepared according to emulsion solidification technology. Such catalysts are disclosed, among others, in EP-A-1539775 or WO-A-03/051934.

Polymerisation

The multimodal ethylene copolymer may be produced in any suitable polymerisation process known in the art. Into the polymerisation zone is also introduced ethylene, optionally an inert diluent, and optionally hydrogen and/or comonomer. The low molecular weight ethylene polymer component is produced in a first polymerisation zone and the high molecular weight ethylene copolymer component is produced in a second polymerisation zone. The first polymerisation zone and the second polymerization zone may be connected in any order, i.e. the first polymerisation zone may precede the second polymerisation zone, or the second polymerisation zone may precede the first polymerisation zone or, alternatively, polymerisation zones may be connected in parallel. However, it is preferred to operate the polymerisation zones in cascaded mode. The polymerisation zones may operate in slurry, solution, or gas phase conditions or their combinations. Suitable reactor configurations are disclosed, among others, in WO-A-92/12182, EP-A-369436, EP-A-503791, EP-A-881237 and WO-A-96/18662. Examples of processes where the polymerisation zones are arranged within one reactor system are disclosed in WO-A-99/03902, EP-A-782587 and EP-A-1633466.

It is often preferred to remove the reactants of the preceding polymerisation stage from the polymer before introducing it into the subsequent polymerisation stage. This is preferably done when transferring the polymer from one polymerisation stage to another. Suitable methods are disclosed, among others, in EP-A-1415999 and WO-A-00/26258.

The polymerisation in the polymerisation zone may be conducted in slurry. Then the polymer particles formed in the polymerisation, together with the catalyst fragmented and dispersed within the particles, are suspended in the fluid hydrocarbon. The slurry is agitated to enable the transfer of reactants from the fluid into the particles.

The polymerisation usually takes place in an inert diluent, typically a hydrocarbon diluent such as methane, ethane, propane, n-butane, isobutane, pentanes, hexanes, heptanes, octanes etc., or their mixtures. Preferably the diluent is a low-boiling hydrocarbon having from 1 to 4 carbon atoms or a mixture of such hydrocarbons. An especially preferred diluent is propane, possibly containing minor amount of methane, ethane and/or butane.

The ethylene content in the fluid phase of the slurry may be from 2 to about 50% by mole, preferably from about 3 to about 20% by mole and in particular from about 5 to about 15% by mole. The benefit of having a high ethylene concentration is that the productivity of the catalyst is increased but the drawback is that more ethylene then needs to be recycled than if the concentration was lower.

The temperature in the slurry polymerisation is typically from 50 to 115° C., preferably from 60 to 110° C. and in particular from 70 to 100° C. The pressure is from 1 to 150 bar, preferably from 10 to 100 bar.

The slurry polymerisation may be conducted in any known reactor used for slurry polymerisation. Such reactors include a continuous stirred tank reactor and a loop reactor. It is especially preferred to conduct the polymerisation in loop reactor. In such reactors the slurry is circulated with a high velocity along a closed pipe by using a circulation pump. Loop reactors are generally known in the art and examples are given, for instance, in U.S. Pat. No. 4,582,816, U.S. Pat. No. 3,405,109, U.S. Pat. No. 3,324,093, EP-A-479186 and U.S. Pat. No. 5,391,654.

It is sometimes advantageous to conduct the slurry polymerisation above the critical temperature and pressure of the fluid mixture. Such operation is described in U.S. Pat. No. 5,391,654. In such operation the temperature is typically from 85 to 110° C., preferably from 90 to 105° C. and the pressure is from 40 to 150 bar, preferably from 50 to 100 bar.

The slurry may be withdrawn from the reactor either continuously or intermittently. A preferred way of intermittent withdrawal is the use of settling legs where slurry is allowed to concentrate before withdrawing a batch of the concentrated slurry from the reactor. The use of settling legs is disclosed, among others, in U.S. Pat. No. 3,374,211, U.S. Pat. No. 3,242,150 and EP-A-1310295. Continuous withdrawal is disclosed, among others, in EP-A-891990, EP-A-1415999, EP-A-1591460 and WO-A-2007/025640. The continuous withdrawal is advantageously combined with a suitable concentration method, as disclosed in EP-A-1310295 and EP-A-1591460.

If the low molecular weight ethylene polymer is produced in slurry polymerisation stage then hydrogen is added to the slurry reactor so that the molar ratio of hydrogen to ethylene in the reaction phase is from 0.1 to 1.0 mol/kmol, and preferably from 0.2 to 0.7 mol/kmol.

Comonomer may then also be introduced into the slurry polymerisation stage so that the molar ratio of comonomer to ethylene in the reaction phase does not exceed 150 mol/kmol, and preferably not 50 mol/kmol. Especially preferably no comonomer is introduced into the slurry polymerisation stage.

If the high molecular weight ethylene polymer is produced in slurry polymerisation stage then hydrogen is added to the slurry reactor so that the molar ratio of hydrogen to ethylene in the reaction phase is at most 0.1 mol/kmol, preferably from 0.01 to 0.07 mol/kmol. Especially preferably, no hydrogen is introduced into the slurry polymerisation stage. Comonomer is introduced into the slurry polymerisation stage so that the molar ratio of comonomer to ethylene is from 50 to 200 mol/kmol, preferably from 70 to 120 mol/kmol.

The polymerisation may also be conducted in gas phase. In a fluidised bed gas phase reactor an olefin is polymerised in the presence of a polymerisation catalyst in an upwards moving gas stream. The reactor typically contains a fluidised bed comprising the growing polymer particles containing the active catalyst located above a fluidisation grid.

The polymer bed is fluidised with the help of the fluidisation gas comprising the olefin monomer, eventual comonomer(s), eventual chain growth controllers or chain transfer agents, such as hydrogen, and eventual inter gas. The fluidisation gas is introduced into an inlet chamber at the bottom of the reactor. To make sure that the gas flow is uniformly distributed over the cross-sectional surface area of the inlet chamber the inlet pipe may be equipped with a flow dividing element as known in the art, e.g. U.S. Pat. No. 4,933,149 and EP-A-684871.

From the inlet chamber the gas flow is passed upwards through a fluidisation grid into the fluidised bed. The purpose of the fluidisation grid is to divide the gas flow evenly through the cross-sectional area of the bed. Sometimes the fluidisation grid may be arranged to establish a gas stream to sweep along the reactor walls, as disclosed in WO-A-2005/087361. Other types of fluidisation grids are disclosed, among others, in U.S. Pat. No. 4,578,879, EP-A-600414 and EP-A-721798. An overview is given in Geldart and Bayens: The Design of Distributors for Gas-fluidized Beds, Powder Technology, Vol. 42, 1985.

The fluidisation gas passes through the fluidised bed. The superficial velocity of the fluidisation gas must be higher that minimum fluidisation velocity of the particles contained in the fluidised bed, as otherwise no fluidisation would occur. On the other hand, the velocity of the gas should be lower than the onset velocity of pneumatic transport, as otherwise the whole bed would be entrained with the fluidisation gas. The minimum fluidisation velocity and the onset velocity of pneumatic transport can be calculated when the particle characteristics are know by using common engineering practise. An overview is given, among others in Geldart: Gas Fluidization Technology, J. Wiley & Sons, 1986.

When the fluidisation gas is contacted with the bed containing the active catalyst the reactive components of the gas, such as monomers and chain transfer agents, react in the presence of the catalyst to produce the polymer product. At the same time the gas is heated by the reaction heat.

The unreacted fluidisation gas is removed from the top of the reactor and cooled in a heat exchanger to remove the heat of reaction. The gas is cooled to a temperature which is lower than that of the bed to prevent the bed from heating because of the reaction. It is possible to cool the gas to a temperature where a part of it condenses. When the liquid droplets enter the reaction zone they are vaporised. The vaporisation heat then contributes to the removal of the reaction heat. This kind of operation is called condensed mode and variations of it are disclosed, among others, in WO-A-2007/025640, U.S. Pat. No. 4,543,399, EP-A-699213 and WO-A-94/25495. It is also possible to add condensing agents into the recycle gas stream, as disclosed in EP-A-696293. The condensing agents are non-polymerisable components, such as n-pentane, isopentane, n-butane or isobutene, which are at least partially condensed in the cooler.

The gas is then compressed and recycled into the inlet chamber of the reactor. Prior to the entry into the reactor fresh reactants are introduced into the fluidisation gas stream to compensate for the losses caused by the reaction and product withdrawal. It is generally known to analyse the composition of the fluidisation gas and introduce the gas components to keep the composition constant. The actual composition is determined by the desired properties of the product and the catalyst used in the polymerisation.

The catalyst may be introduced into the reactor in various ways, either continuously or intermittently. Among others, WO-A-01/05845 and EP-A-499759 disclose such methods. Where the gas phase reactor is a part of a reactor cascade the catalyst is usually dispersed within the polymer particles from the preceding polymerisation stage. The polymer particles may be introduced into the gas phase reactor as disclosed in EP-A-1415999 and WO-A-00/26258.

The polymeric product may be withdrawn from the gas phase reactor either continuously or intermittently. Combinations of these methods may also be used. Continuous withdrawal is disclosed, among others, in WO-A-00/29452. Intermittent withdrawal is disclosed, among others, in U.S. Pat. No. 4,621,952, EP-A-188125, EP-A-250169 and EP-A-579426.

The top part of the gas phase reactor may include a so called disengagement zone. In such a zone the diameter of the reactor is increased to reduce the gas velocity and allow the particles that are carried from the bed with the fluidisation gas to settle back to the bed.

The bed level may be observed by different techniques known in the art. For instance, the pressure difference between the bottom of the reactor and a specific height of the bed may be recorded over the whole length of the reactor and the bed level may be calculated based on the pressure difference values. Such a calculation yields a time-averaged level. It is also possible to use ultrasonic sensors or radioactive sensors. With these methods instantaneous levels may be obtained, which of course may then be averaged over time to obtain time-averaged bed level.

Also antistatic agent(s) may be introduced into the gas phase reactor if needed. Suitable antistatic agents and methods to use them are disclosed, among others, in U.S. Pat. No. 5,026,795, U.S. Pat. No. 4,803,251, U.S. Pat. No. 4,532,311, U.S. Pat. No. 4,855,370 and EP-A-560035. They are usually polar compounds and include, among others, water, ketones, aldehydes and alcohols.

The reactor may also include a mechanical agitator to further facilitate mixing within the fluidised bed. An example of suitable agitator design is given in EP-A-707513.

If the low molecular weight ethylene polymer is produced in gas phase polymerisation stage then hydrogen is added to the gas phase reactor so that the molar ratio of hydrogen to ethylene is from 0.5 to 1.5 mol/kmol, and preferably from 0.7 to 1.3 mol/kmol. Comonomer may then also be introduced into the gas phase polymerisation stage so that the molar ratio of comonomer to ethylene does not exceed 20 mol/kmol, and preferably not 15 mol/kmol. Especially preferably no comonomer is introduced into the gas phase polymerisation stage.

If the high molecular weight ethylene polymer is produced in gas phase polymerisation stage then hydrogen is added to the gas phase reactor so that the molar ratio of hydrogen to ethylene is at most 0.4 mol/kmol, preferably at most 0.3 mol/kmol. Especially preferably, no hydrogen is introduced into the gas phase polymerisation stage. Comonomer is introduced into the gas phase polymerisation stage so that the molar ratio of comonomer to ethylene is from 5 to 50 mol/kmol.

Polymer Composition

In addition to the multimodal ethylene copolymer the polymer composition comprises additives, fillers and adjuvants known in the art. It may also contain additional polymers, such as carrier polymers of the additive masterbatches. Typically the polymer composition comprises at least 50% by weight of the multimodal ethylene copolymer, preferably from 80 to 100% by weight and more preferably from 85 to 100% by weight, based on the total weight of the composition.

Suitable antioxidants and stabilizers are, for instance, sterically hindered phenols, phosphates or phosphonites, sulphur containing antioxidants, alkyl radical scavengers, aromatic amines, hindered amine stabilizers and the blends containing compounds from two or more of the above-mentioned groups.

Examples of sterically hindered phenols are, among others, 2,6-di-tert-butyl-4-methyl phenol (sold, e.g., by Degussa under a trade name of Ionol CP), pentaerythrityl-tetrakis(3-(3',5'-di-tert. butyl-4-hydroxyphenyl)-propionate (sold, e.g., by Ciba Specialty Chemicals under the trade name of Irganox 1010) octadecyl-3-3(3'5'-di-tert-butyl-4'-hydroxyphenyl) propionate (sold, e.g., by Ciba Specialty Chemicals under the trade name of Irganox 1076) and 2,5,7,8-tetramethyl-2(4',8', 12'-trimethyltridecyl)chroman-6-ol (sold, e.g., by BASF under the trade name of Alpha-Tocopherol).

Examples of phosphates and phosphonites are tris(2,4-di-t-butylphenyl) phosphite (sold, e.g., by Ciba Specialty Chemicals under the trade name of Irgafos 168), tetrakis-(2, 4-di-t-butylphenyl)-4,4'-biphenylen-di-phosphonite (sold, e.g., by Ciba Specialty Chemicals under the trade name of Irgafos P-EPQ) and tris-(nonylphenyl)phosphate (sold, e.g., by Dover Chemical under the trade name of Doverphos HiPure 4)

Examples of sulphur-containing antioxidants are dilaurylthiodipropionate (sold, e.g., by Ciba Specialty Chemicals under the trade name of Irganox PS 800), and distearylthiodipropionate (sold, e.g., by Chemtura under the trade name of Lowinox DSTDB).

Examples of nitrogen-containing antioxidants are 4,4'-bis (1,1'-dimethylbenzyl)diphenylamine (sold, e.g., by Chemtura under the trade name of Naugard 445), polymer of 2,2, 4-trimethyl-1,2-dihydroquinoline (sold, e.g., by Chemtura under the trade name of Naugard EL-17), p-(p-toluene-sulfonylamido)-diphenylamine (sold, e.g., by Chemtura under the trade name of Naugard SA) and N,N'-diphenyl-p-phenylene-diamine (sold, e.g., by Chemtura under the trade name of Naugard J).

Commercially available blends of antioxidants and process stabilizers are also available, such as Irganox B225, Irganox B215 and Irganox B561 marketed by Ciba-Geigy.

Suitable acid scavengers are, for instance, metal stearates, such as calcium stearate and zinc stearate. They are used in amounts generally known in the art, typically from 500 ppm to 10000 ppm and preferably from 500 to 5000 ppm.

Carbon black is a generally used pigment, which also acts as an UV-screener. Typically carbon black is used in an amount of from 0.5 to 5% by weight, preferably from 1.5 to 3.0% by weight. Preferably the carbon black is added as a masterbatch where it is premixed with a polymer, preferably high density polyethylene (HDPE), in a specific amount. Suitable masterbatches are, among others, HD4394, sold by Cabot Corporation, and PPM1805 by Poly Plast Muller. Also titanium oxide may be used as an UV-screener.

The composition comprising the multimodal ethylene copolymer has good mechanical properties. Preferably it has Charpy impact strength, measured at 0° C., of at least 15 kJ/m$^2$, more preferably of at least 20 kJ/m$^2$. Typically the Charpy impact strength may be from 25 to 39 kJ/m$^2$.

Homogenisation and Pelletisation

The composition comprising the multimodal ethylene copolymer is homogenised and pelletised using a method known in the art. Preferably, a twin screw extruder is used. Such extruders are known in the art and they can be divided in co-rotating twin screw extruders, as disclosed in WO-A-98/15591, and counter-rotating twin screw extruders, as disclosed in EP-A-1600276 In the co-rotating twin screw extruder the screws rotate in the same direction whereas in the counter-rotating extruder they rotate in opposite directions. An overview is given, for example, in Rauwendaal: Polymer Extrusion (Hanser, 1986), chapters 10.3 to 10.5, pages 460 to 489. Especially preferably a counter-rotating twin screw extruder is used.

To ensure sufficient homogenisation of the polymer composition during the extrusion the specific energy input must be on a sufficiently high level. On the other hand, it must not be excessive, as otherwise degradation of polymer would occur. Also the additives could partly degrade due to too high energy input, and the degradation products of the polymer and the additives could cause offensive odour and/or taste in the polymer. The required SEI level depends somewhat on the screw configuration and design. Suitable levels of specific energy input (SEI) are from 200 to 300 kWh/ton, preferably from 210 to 290 kWh/ton. Especially good results have been obtained when the SEI is within the range disclosed above and a counter-rotating twin screw extruder having a screw design according to EP-A-1600276 is used.

Pipe and Pipe Manufacture

Pipes according to the present invention are produced according to the methods known in the art from the polymer composition as described above. Thus, according to one preferred method the polymer composition is extruded through an annular die to a desired internal diameter, after which the polymer composition is cooled.

The pipe extruder preferably operates at a relatively low temperature and therefore excessive heat build-up should be avoided. Extruders having a high length to diameter ratio L/D more than 15, preferably of at least 20 and in particular of at least 25 are preferred. The modern extruders typically have an L/D ratio of from about 30 to 35.

The polymer melt is extruded through an annular die, which may be arranged either as end-fed or side-fed configuration. The side-fed dies are often mounted with their axis parallel to that of the extruder, requiring a right-angle turn in the connection to the extruder. The advantage of side-fed dies is that the mandrel can be extended through the die and this allows, for instance, easy access for cooling water piping to the mandrel.

After the plastic melt leaves the die it is calibrated to the correct diameter. In one method the extrudate is directed into a metal tube (calibration sleeve). The inside of the extrudate is pressurised so that the plastic is pressed against the wall of the tube. The tube is cooled by using a jacket or by passing cold water over it.

According to another method a water-cooled extension is attached to the end of the die mandrel. The extension is thermally insulated from the die mandrel and is cooled by water circulated through the die mandrel. The extrudate is drawn over the mandrel which determines the shape of the pipe and holds it in shape during cooling. Cold water is flowed over the outside pipe surface for cooling.

According to still another method the extrudate leaving the die is directed into a tube having perforated section in the centre. A slight vacuum is drawn through the perforation to hold the pipe hold the pipe against the walls of the sizing chamber.

After the sizing the pipe is cooled, typically in a water bath having a length of about 5 meters or more.

The pipes according to the present invention fulfil the requirements of PE80 standard as defined in EN 12201 and EN 1555, alternatively ISO 4427 and ISO 4437, evaluated according to ISO 9080.

EXAMPLES

Methods
Melt Index

The melt flow rate (MFR) is determined according to ISO 1133 and is indicated in g/10 min. The MFR is an indication of the melt viscosity of the polymer. The MFR is determined at 190° C. for PE. The load under which the melt flow rate is determined is usually indicated as a subscript, for instance $MFR_2$ is measured under 2.16 kg load (condition D), $MFR_5$ is measured under 5 kg load (condition T) or $MFR_{21}$ is measured under 21.6 kg load (condition G).

The quantity FRR (flow rate ratio) is an indication of molecular weight distribution and denotes the ratio of flow rates at different loads. Thus, $FRR_{21/2}$ denotes the value of $MFR_{21}/MFR_2$.

Density

Density of the polymer was measured according to ISO 1183/1872-2B.

For the purpose of this invention the density of the blend can be calculated from the densities of the components according to:

$$\rho_b = \sum_i w_i \cdot \rho_i$$

where $\rho_b$ is the density of the blend,
$w_i$ is the weight fraction of component "i" in the blend and
$\rho_i$ is the density of the component "i".

Molecular Weight

Mw, Mn and MWD are measured by Gel Permeation Chromatography (GPC) according to the following method:

The weight average molecular weight Mw and the molecular weight distribution (MWD=Mw/Mn wherein Mn is the number average molecular weight and Mw is the weight average molecular weight) is measured according to ISO 16014-4:2003 and ASTM D 6474-99. A Waters GPCV2000 instrument, equipped with refractive index detector and online viscosimeter was used with 2×GMHXL-HT and 1× G7000HXL-HT TSK-gel columns from Tosoh Bioscience and 1,2,4-trichlorobenzene (TCB, stabilized with 250 mg/L 2,6-Di tert-butyl-4-methyl-phenol) as solvent at 140° C. and at a constant flow rate of 1 mL/min. 209.5 μL of sample solution were injected per analysis. The column set was calibrated using universal calibration (according to ISO 16014-2:2003) with at least 15 narrow MWD polystyrene (PS) standards in the range of 1 kg/mol to 12 000 kg/mol. Mark Houwink constants were used as given in ASTM D 6474-99. All samples were prepared by dissolving 0.5-4.0 mg of polymer in 4 mL (at 140° C.) of stabilized TCB (same as mobile phase) and keeping for max. 3 hours at a maximum temperature of 160° C. with continuous gentle shaking prior sampling in into the GPC instrument.

As it is known in the art, the weight average molecular weight of a blend can be calculated if the molecular weights of its components are known according to:

$$Mw_b = \sum_i w_i \cdot Mw_i$$

where $Mw_b$ is the weight average molecular weight of the blend,
$w_i$ is the weight fraction of component "i" in the blend and
$Mw_i$ is the weight average molecular weight of the component "i".

The number average molecular weight can be calculated using the well-known mixing rule:

$$\frac{1}{Mn_b} = \sum_i \frac{w_i}{Mn_i}$$

where $Mn_b$ is the weight average molecular weight of the blend,
$w_i$ is the weight fraction of component "i" in the blend and
$Mn_i$ is the weight average molecular weight of the component "i".

Rheology

Rheological parameters such as Shear Thinning Index SHI and Viscosity are determined by using a rheometer, preferably a Anton Paar Physica MCR 300 Rheometer on compression moulded samples under nitrogen atmosphere at 190° C. using 25 mm diameter plates and plate and plate geometry with a 1.8 mm gap according to ASTM 1440-95. The oscillatory shear experiments were done within the linear viscosity range of strain at frequencies from 0.05 to 300 rad/s (ISO 6721-1). Five measurement points per decade were made. The method is described in detail in WO 00/22040.

The values of storage modulus (G'), loss modulus (G") complex modulus (G*) and complex viscosity (η*) were obtained as a function of frequency (ω). $\eta_{100}$ is used as abbreviation for the complex viscosity at the frequency of 100 rad/s.

Shear thinning index (SHI), which correlates with MWD and is independent of Mw, was calculated according to Heino ("Rheological characterization of polyethylene fractions" Heino, E. L., Lehtinen, A., Tanner J., Seppälä J., Neste Oy, Porvoo, Finland, Theor. Appl. Rheol., Proc. Int. Congr. Rheol, 11th (1992), 1, 360-362, and "The influence of molecular structure on some rheological properties of polyethylene", Heino, E. L., Borealis Polymers Oy, Porvoo, Finland, Annual Transactions of the Nordic Rheology Society, 1995.).

SHI value is obtained by calculating the complex viscosities at given values of complex modulus and calculating the ratio of the two viscosities. For example, using the values of complex modulus of 2.7 kPa and 210 kPa, then η*(2.7 kPa) and η*(210 kPa) are obtained at a constant value of complex modulus of 2.7 kPa and 210 kPa, respectively. The shear thinning index $SHI_{2.7/210}$ is then defined as the ratio of the two viscosities η*(2.7 kPa) and η*(210 kPa), i.e. η(2.7)/η(210).

It is not always practical to measure the complex viscosity at a low value of the frequency directly. The value can be extrapolated by conducting the measurements down to the frequency of 0.126 rad/s, drawing the plot of complex viscosity vs. frequency in a logarithmic scale, drawing a best-fitting line through the five points corresponding to the lowest values of frequency and reading the viscosity value from this line.

Charpy Impact Strength

Charpy impact strength was determined according to ISO 179-1:2000 according to conditions 1 eA on V-notched samples at 0° C.

The test specimens were compression moulded samples of multipurpose type B (ISO 3167) with a thickness of 4 mm. Average cooling rate was 15 K/min (ISO 1872-2).

Flexural Modulus

Flexural modulus was determined according to ISO 178. The test specimens were 80×10×4.0 mm (length×width×thickness). The length of the span between the supports was 64 mm, the test speed was 2 mm/min and the load cell was 100 N. The equipment used was an Alwetron TCT 25.

TREF

The chemical composition distribution was determined by analytical Temperature Rising Elution Fractionation (a-TREF) as described in J. B. P. Soares, A. E. Hamielec; Temperature rising elution fractionation of linear polyolefins; Polymer 1995, 36 (8), 1639-1654 and Soares, J. B. P., Fractionation, In: Encyclopaedia Of Polymer Science and Technology, John Wiley & Sons, New York, pp. 75-131, Vol. 10, 2001. The separation of the polymer in a-TREF is according to crystallinity. The TREF profiles were generated using a CRYSTAF-TREF 200+ instrument manufactured by PolymerChar S.A. (Valencia, Spain). The experimental procedure, as described in N. Aust, M. Gahleitner, K. Reichelt, B. Raninger; Optimization of run parameters of temperature-rising elution fractionation with the aid of a factorial design experiment; Polymer Testing 2006, 25 (7), 896-903 was as follows:

In the dissolution step, the polymer sample was dissolved in 1,2,4-trichlorobenzene (TCB, 2 to 4 mg/mL, stabilized with 300 mg/L 2,6-Di tert-butyl-4-methyl-phenol) in one of the vessels at a concentration of 4 mg/mL at 160° C. for 90 min. The sample was then loaded into the TREF column (7.8 mm inner diameter, 15 cm length, packed with stainless steel shots as inert support), and held at 110° C. for 30 min for stabilization. The polymer sample was crystallized and precipitated onto the support inside the TREF column by a slow reduction of the temperature to 30° C. under a constant cooling rate (0.1° C./min). The column temperature was kept at 30° C. for 25 min for stabilization before the elution step started. In the elution step, a solvent (TCB) flowed through the column at a constant flow rate of 0.5 mL/min while the temperature in the column was first held for 10 min at 30° C. to measure the remaining soluble fraction, followed by slowly increasing the temperature to 130° C. at a constant heating rate (0.5° C./min). The concentration of the polymer being eluted was measured during the whole elution step with an infrared detector (measuring the C—H absorption at 3.5 microns wavelength) and recorded together with the temperature in the column oven as a function of time.

The concentration signal was plotted as a function of the elution temperature (TREF profile). For convenience the under isothermal conditions (30° C., 10 min) measured soluble fraction was added to this plot by converting the time into temperature using the constant heating rate of 0.5° C./min. In the TREF calculation software (by Polymer Char, version 07a) the concentration plot (TREF profile) was normalized including the soluble fraction.

Example 1

Preparation of the Catalyst
Complex Preparation:

The catalyst complex used in the polymerisation example was silica supported bis(n-butylcyclopentadienyl)hafnium dibenzyl, (n-BuCp)$_2$Hf(CH$_2$Ph)$_2$ and it was prepared according to "Catalyst Preparation Example 2" of WO 2005/002744, starting from bis(n-butylcyclopentadienyl)hafnium dichloride (supplied by Witco).

Activated Catalyst System:

Complex solution of 0.80 ml toluene, 38.2 mg (n-BuCp)$_2$Hf(CH$_2$Ph)$_2$ prepared as above and 2.80 ml 30 wt % methylalumoxane in toluene (MAO, supplied by Albemarle) was prepared at a room temperature (24° C.). Precontact time was 60 minutes. The resulting complex solution was added slowly onto 2.0 g activated silica (commercial silica carrier, XPO2485A, having an average particle size 20 µm, supplier: Grace). Contact time was 2 h at 24° C. The catalyst was dried under nitrogen purge for 3 h at 50° C. The obtained catalyst had Al/Hf-ratio of 200 mol/mol and a Hf-content of 0.40 wt-%.

Two-Stage Polymerisation

A loop reactor having a volume of 500 dm$^3$ was operated at 85° C. and 58 bar pressure. Into the reactor were introduced 130 kg/h of propane diluent, 47 kg/h ethylene and 4 kg/h of 1-hexene. In addition, polymerisation catalyst prepared according to the description above was introduced into the reactor so that the polymerisation rate was 40 kg/h and the conditions in the reactor as shown in Table 1.

The polymer slurry was withdrawn from the loop reactor and transferred into a flash vessel operated at 3 bar pressure and 70° C. temperature where the hydrocarbons were substantially removed from the polymer. The polymer was then introduced into a gas phase reactor operated at a temperature of 80° C. and a pressure of 20 bar. In addition 82 kg/h ethylene, 1.3 kg/h 1-butene and 7 g/h hydrogen was introduced into the reactor. The conditions are shown in Table 1.

The resulting polymer was stabilised with 3000 ppm of Irganox B225 and 1500 ppm Ca-stearate and then extruded to pellets in a counter-rotating twin screw extruder CIM90P (manufactured by Japan Steel Works) so that the throughput was 220 kg/h and the screw speed was 349 RPM.

Figure 1:
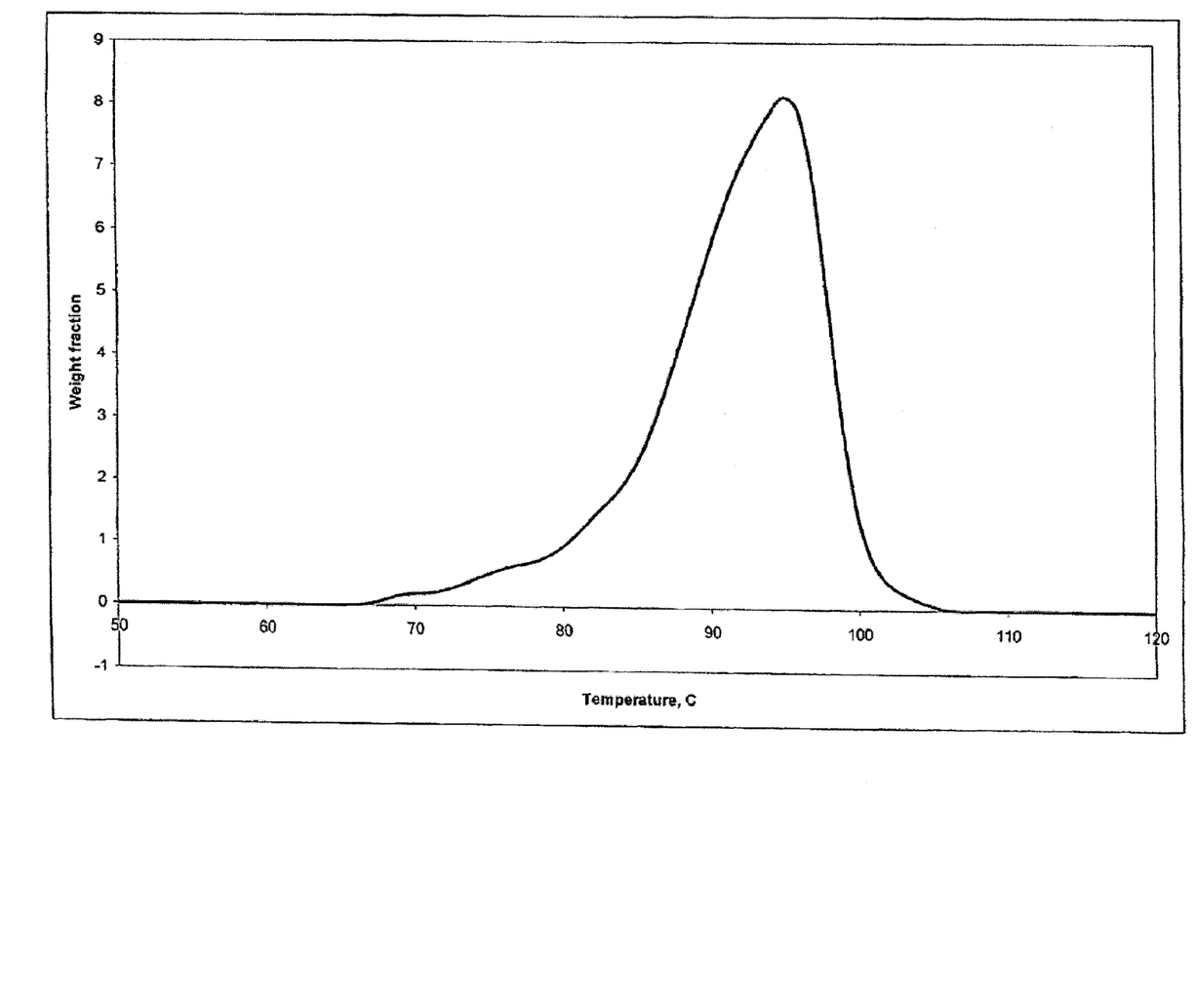
FIG. 1 shows a TREF fractogram of a polymer according to the invention.

The polymer of Example 1 was subjected to TREF analysis. FIG. 1 shows the resulting fractogram.

Comparative Example 1

Into a 50 dm$^3$ loop reactor operated at 60° C. temperature and 63 bar pressure were introduced ethylene (1.2 kg/h), propane diluent, hydrogen and a polymerisation catalyst. The solid catalyst component was a commercially available product produced and sold by Engelhard Corporation in Pasadena, USA under a trade name of Lynx 200 (now supplied by BASF). The solid component was used together with triethylaluminium cocatalyst so that the molar ratio of Al/Ti was from 30 to 100. The resulting ethylene homopolymer had an MFR$_5$ of 0.5 g/10 min.

The slurry from the loop reactor was introduced into the second loop reactor having 500 dm$^3$ volume operated at 85° C. and 57 bar where additional ethylene, propane and hydrogen were introduced. The resulting slurry was withdrawn into the flash vessel and the polymer was directed into the gas phase reactor operated at 85° C. and 20 bar where additional ethylene, 1-butene comonomer and hydrogen were introduced. The final polymer was mixed with the additives and extruded. Data is shown in Table 1.

TABLE 1

Experimental conditions and data

| | Example 1 | C.E. 1 | C.E. 2 |
|---|---|---|---|
| Loop reactor | | | |
| $H_2/C_2$, mol/kmol | 0.06 | 947 | 0.46 |
| $C_6/C_2$, mol/kmol | 89 | 0 | 0 |
| $C_4/C_2$, mol/kmol | 0 | 0 | 92 |
| Ethylene content, mol-% | 9.0 | 5.6 | 5.7 |
| Production rate, kg/h | 40 | 22 | 34 |
| Polymer $MFR_{21}$, g/10 min | 2.0 | | |
| Polymer $MFR_2$, g/10 min | | 442 | 110 |
| Polymer density, kg/m³ | 919.6 | 975 | 939 |
| Polymer Mw, g/mol | 245000 | | |
| Polymer Mn, g/mol | 106000 | | |
| Gas phase reactor | | | |
| $H_2/C_2$, mol/kmol | 1.0 | 48 | 0 |
| $C_4/C_2$, mol/kmol | 8 | 218 | 0 |
| $C_6/C_2$, mol/kmol | 0 | 0 | 4 |
| Ethylene content, mol-% | 47 | 18 | |
| Production rate, kg/h | 27 | 28 | 33 |
| Split, LMW/HMW, %/% | 41/59 | 2/44/54 | 51/49 |
| Calculated density, kg/m³ | 948 | | 933 |
| Extruder | | | |
| Throughput, kg/h | 220 | 221 | 217 |
| SEI, kWh/ton | 275 | 280 | 277 |
| Melt temperature, °C. | 225 | 226 | 222 |
| Final polymer | | | |
| Polymer $MFR_2$, g/10 min | 0.45 | | 0.45 |
| Polymer $MFR_5$, g/10 min | 1.3 | 0.91 | 1.4 |
| Polymer $MFR_{21}$, g/10 min | 12.7 | 25 | |
| Polymer density, kg/m³ | 931 | 941 | 936 |
| Mw, g/mol | 161000 | | |
| Mn, g/mol | 24800 | | |
| Mw/Mn | 6.5 | | |
| $\eta_{2.7}$, Pas | 18100 | 52000 | |
| $SHI_{2.7/100}$ | 5.5 | 33 | 8.6 |
| Flexural modulus, MPa | 570 | 880 | 596 |
| Charpy Impact (0° C.), kJ/m² | 30.9 | 10 | 10 |

Comparative Example 2

A loop reactor having a volume of 500 dm³ was operated at 85° C. and 58 bar pressure. Into the reactor were introduced propane diluent, ethylene, hydrogen and 1-butene. In addition, polymerisation catalyst prepared according to the description of Example 1 was introduced into the reactor so that the polymerisation rate was 34 kg/h and the conditions in the reactor as shown in Table 1.

The polymer slurry was withdrawn from the loop reactor and transferred into a flash vessel operated at 3 bar pressure and 70° C. temperature where the hydrocarbons were substantially removed from the polymer. The polymer was then introduced into a gas phase reactor operated at a temperature of 80° C. and a pressure of 20 bar. In addition ethylene and 1-hexene were introduced into the reactor. The conditions are shown in Table 1.

The resulting polymer was stabilised with 3000 ppm of Irganox B225 and 1500 ppm Ca-stearate and then extruded to pellets in a counter-rotating twin screw extruder CIM90P (manufactured by Japan Steel Works) so that the throughput was 217 kg/h and the screw speed was 349 RPM.

The invention claimed is:

1. A polymer composition comprising a multimodal copolymer of ethylene and one or more alpha-olefins having from 4 to 10 carbon atoms wherein the multimodal ethylene copolymer has a density of from 927 to 933 kg/m³, a melt index $MFR_5$ of from 0.5 to 6.0 g/10 min, a melt index $MFR_2$ of from 0.1 to 2.0 g/10 min and a shear thinning index $SHI_{2.7/210}$ of from 2 to 20.

2. The polymer composition according to claim 1 having a melt index $MFR_5$ of from 0.5 to 2.0 g/10 min, and a melt index $MFR_2$ of from 0.2 to 2.0 g/10 min.

3. The polymer composition according to claim 1, wherein the multimodal ethylene copolymer has an $SHI_{2.7/210}$ of from 3 to 15.

4. The polymer composition according to claim 1, wherein the multimodal ethylene copolymer has a weight average molecular weight Mw of 75000 g/mol to 250000 g/mol and a ratio of the weight average molecular weight to the number average molecular weight, Mw/Mn, of from 4 to 15.

5. The polymer composition according to claim 1, wherein the multimodal ethylene copolymer comprises:
   (A) from 30 to 70% by weight, based on the combined amount of components (A) and (B), of a low molecular weight ethylene polymer selected from ethylene homopolymer and a copolymer of ethylene and one or more alpha-olefins having from 4 to 10 carbon atoms and having a weight average molecular weight of from 5000 to 100000 g/mol and a density of from 945 to 975 kg/m³; and
   (B) from 30 to 70% by weight, based on the combined amount of components (A) and (B), of a high molecular weight copolymer of ethylene and one or more alpha-olefins having from 4 to 10 carbon atoms and having a weight average molecular weight of from 100000 to 1000000 g/mol and a density of from 890 to 929 kg/m³.

6. The polymer composition according to claim 5, wherein the high molecular weight copolymer and the low molecular weight ethylene homo- or copolymer are obtainable by polymerising ethylene in the presence of a metallocene catalyst and an activator for the metallocene catalyst.

7. The polymer composition according to claim 1, wherein the polymer composition has a Charpy impact strength, measured at 0° C. according to ISO 179-1:2000 according to conditions 1 eA on V-notched samples from compression moulded test specimens of type B as defined in ISO 3167 with a thickness of 4 mm, of at least 15 kJ/m².

8. A process for producing the polymer composition according to claim 5, comprising the steps of:
   (i) polymerising, in a first polymerisation step in a first polymerisation zone, in the presence of a single site polymerisation catalyst, ethylene, hydrogen and optionally one or more alpha-olefins having 4 to 10 carbon atoms to form the low molecular weight component (A) having a weight average molecular weight of from 5000 to 100000 g/mol and a density of from 945 to 975 kg/m³;
   (ii) polymerising, in a second polymerisation step in a second polymerisation zone, in the presence of a single site polymerisation catalyst, ethylene, one or more alpha-olefins having 4 to 10 carbon atoms and optionally hydrogen to form the high molecular weight component (B) having a weight average molecular weight of from 100000 to 1000000 g/mol and a density of from 890 to 929 kg/m³;
   wherein the first polymerisation step and the second polymerisation step may be conducted in any order and the subsequent step is conducted in the presence of the polymer produced in the prior step and the components (A) and (B) are present in the amounts of 30 to 70% and 70 to 30%, respectively, based on the combined amounts of components (A) and (B).

9. The process according to claim 8, wherein said catalyst is a single site catalyst comprising a metallocene compound and an activator compound.

10. The process according to claim 9, wherein the activator compound is an alumoxane, preferably a methylalumoxane.

11. The process according to claim 9, wherein the metallocene compound is selected from the group consisting of [ethylenebis(3,7-di(tri-isopropylsiloxy)inden-1-yl)]zirconium dichloride, [ethylenebis(4,7-di(tri-isopropylsiloxy)inden-1-yl)]zirconium dichloride, [ethylenebis(5-tert-butyldimethylsiloxy)inden-1-yl)]zirconium dichloride, bis(5-tert-butyldimethylsiloxy)inden-1-yl)zirconium dichloride, [dimethylsilylenenebis(5-tert-butyldimethylsiloxy)inden-1-yl)]zirconium dichloride, (N-tert-butylamido)(dimethyl)($\eta^5$-inden-4-yloxy)silanetitanium dichloride, [ethylenebis(2-(tert-butydimethylsiloxy)inden-1-yl)]zirconium dichloride, bis(n-butylcyclopentadienyl)hafnium dichloride, bis(n-butylcyclopentadienyl)dibenzylhafnium, dimethylsilylenenebis(n-butylcyclopentadienyl)hafnium dichloride, bis[1,2,4-tri(ethyl)cyclopentadienyl]hafnium dichloride, bis(4,5,6,7-tetrahydroindenyl)zirconium dichloride, bis(4,5,6,7-tetrahydroindenyl)hafnium dichloride, ethylenebis(4,5,6,7-tetrahydroindenyl)zirconium dichloride and dimethylsilylenebis(4,5,6,7-tetrahydroindenyl)zirconium dichloride.

12. The process according to claim 8, wherein the high molecular weight component (B) has a weight average molecular weight of from 150000 to 500000 g/mol.

13. A pipe comprising the composition according to claim 1.

14. A pipe according to claim 13 comprising from 85 to 100% of said polymer composition.

15. A method comprising using of the pipe of claim 13 for the transmission of water or gas under pressure.

* * * * *